July 7, 1959

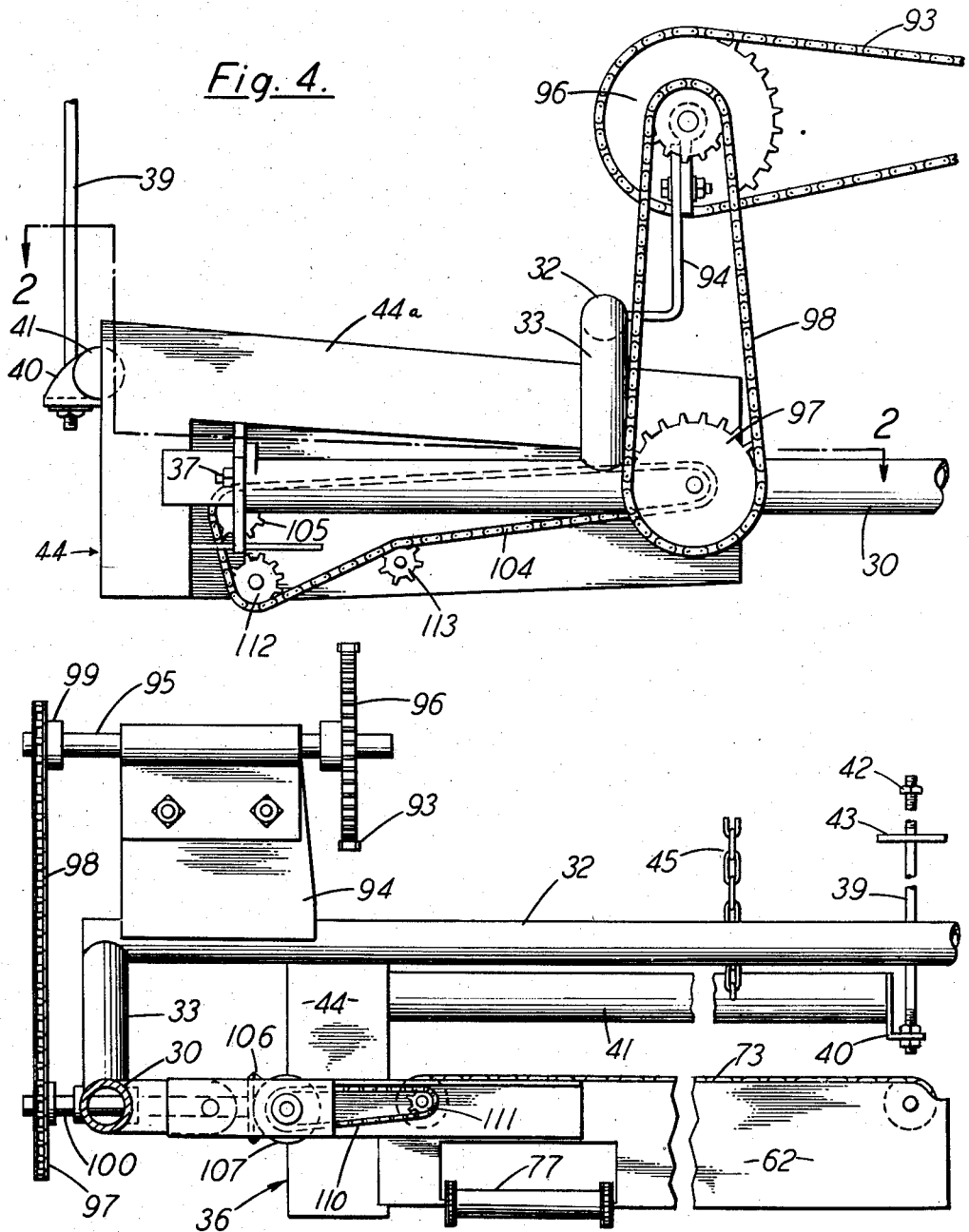

L. GILBERT 2,893,193

CUCUMBER HARVESTING MACHINE

Filed March 16, 1955

INVENTOR.
Lloyd Gilbert
-BY-
Attorney

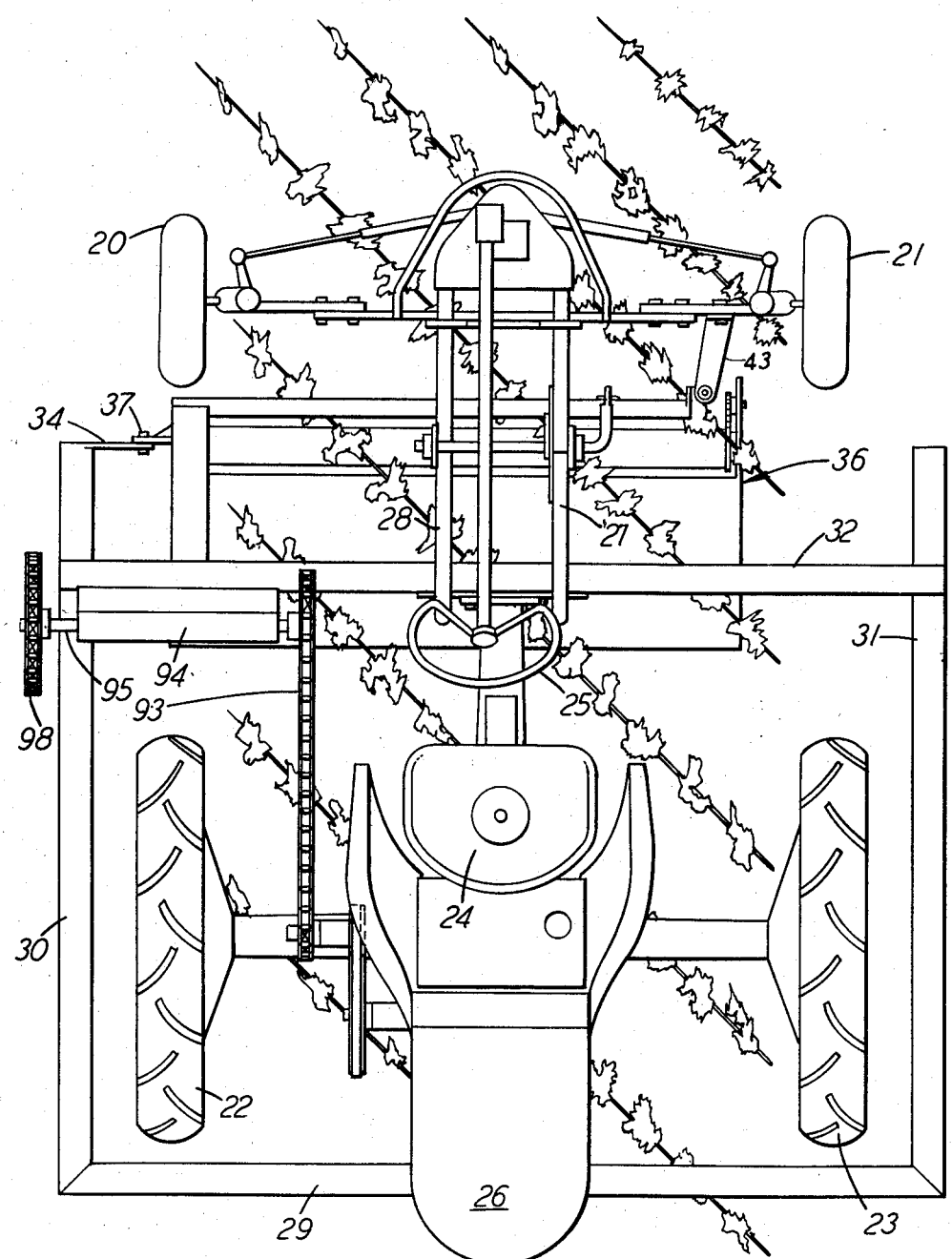

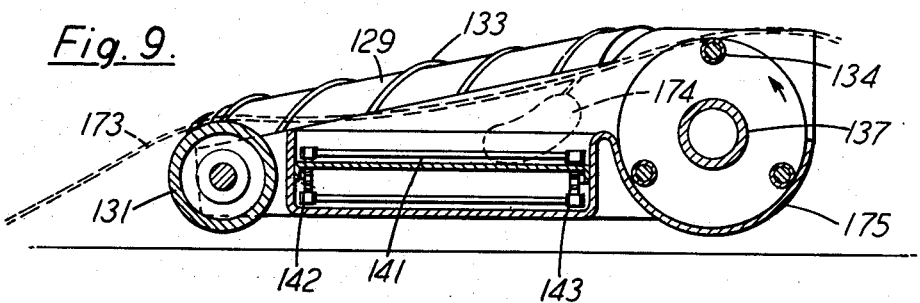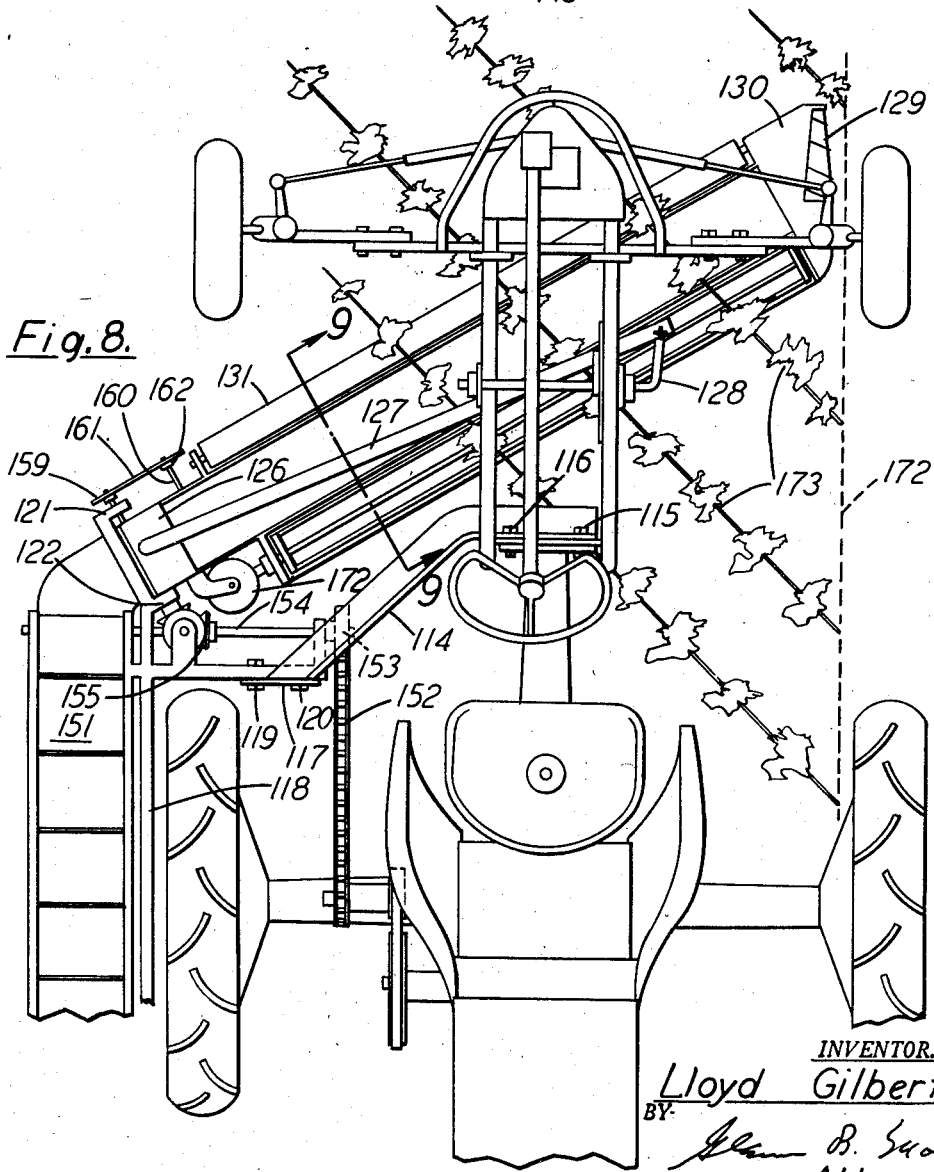

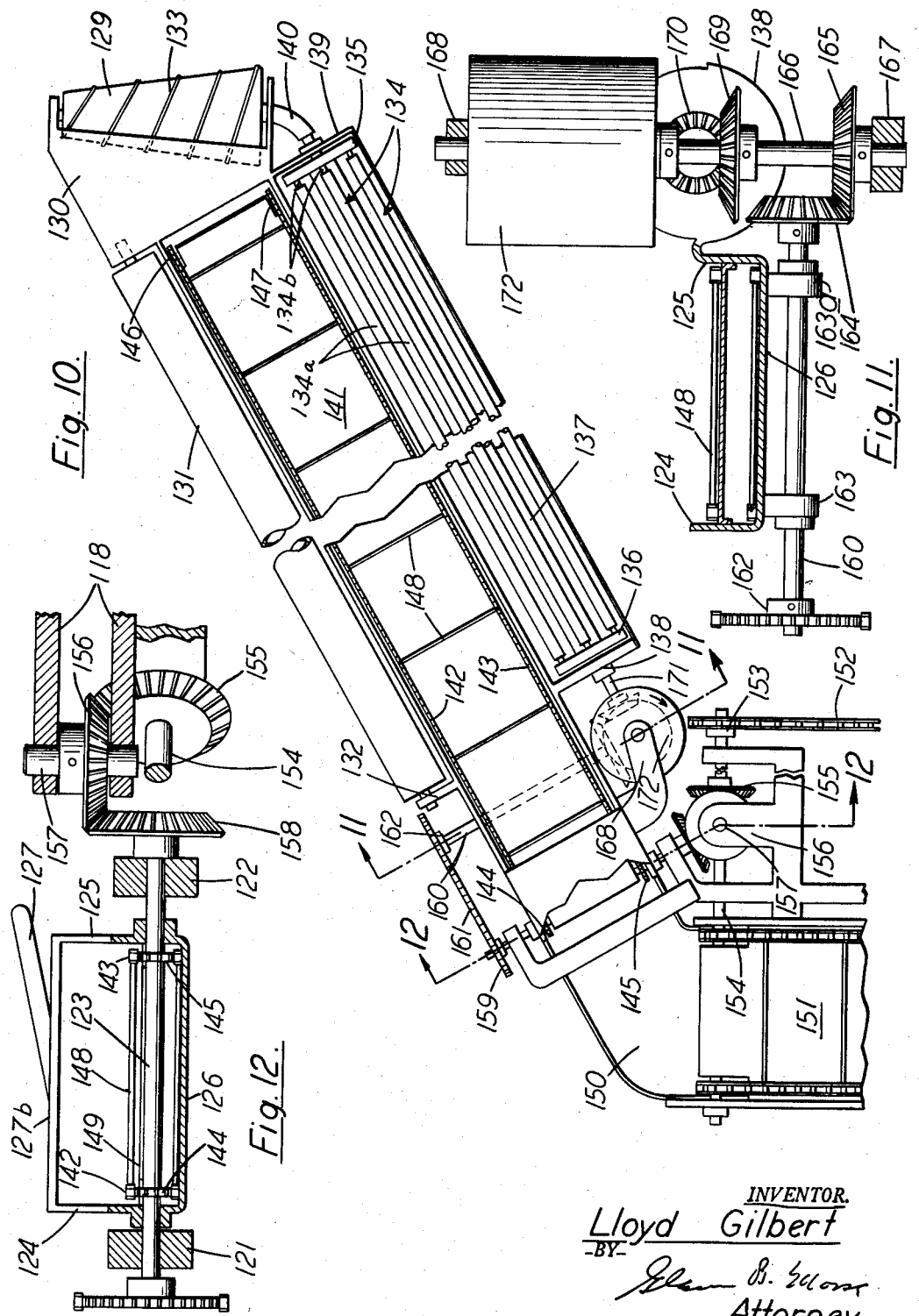

United States Patent Office 2,893,193
Patented July 7, 1959

2,893,193
CUCUMBER HARVESTING MACHINE

Lloyd Gilbert, Ravenna, Mich.

Application March 16, 1955, Serial No. 494,661

13 Claims. (Cl. 56—327)

This invention relates to the construction of machines used in the harvesting of cucumbers. This crop grows and develops on vines which extend for a considerable distance along the ground, and it has become general practice to train these vines along an angle of approximately 45° from the direction of the planting row. The angular disposal of the vines may extend entirely to one side of the planting row, or the vines may be alternately arranged in the manner of a herringbone formation such that the plants alternately form an angle of 45° in the opposite direction from the centerline. The function of the cucumber-harvesting machine is to move along these rows without disturbing the arrangement of the vines, and to remove all of the cucumbers in excess of a certain size without causing damage to vines, leaf structure, or to the remaining cucumbers which are left to more fully mature. In machines embodying this invention, the picking operation involves the gentle elevation of the vines at a point adjacent the root, and the gradual continuing elevation of the entire vine as the machine moves along its path. The purpose of the elevation of the vine is to permit the picking equipment to pass underneath, so that the depending cucumbers may be removed and conveyed out to a collecting point.

The picking mechanism provided by this invention involves the relatively rapid movement of a series of striking members which result in knocking the cucumbers from the vines into a collector. The relative velocity of the striking members with respect to the vines may be selected or adjusted with the net effect of determining the minimum size of cucumber that is removed. As the cucumber proceeds to maturity, it progressively increases in size. The consequent increase in mass and inertia of the older cucumbers makes them more vulnerable to the striking action of the picking mechanism. As a result, a given velocity of movement will tend to remove cucumbers in excess of a particular critical size, and an increase in velocity will result in removing smaller cucumbers.

Preferably, the picking equipment (and also the vine-elevating and guiding system) is assembled in conjunction with a light-duty four-wheeled tractor as a supporting vehicle. The picking equipment extends transversely in the central area of the vehicle, and is suspended from a point adjacent one side on a pivot mounting, resulting in the vertical adjustability of the opposite end. Such vertical adjustability can accommodate the machine for various conditions such as softness of the ground, the type and age of the vines, and other such variables. The pivoted suspension of the picking mechanism also readily accommodates an elevating system with which the device may be lifted upwardly out of a working position when the tractor is simply being driven from one place to another.

It is also preferable to provide a conveying unit in conjunction with the picking mechanism for the collection of the cucumbers and the rapid movement of them from the picking area laterally outward to where they can either be accumulated in a bin or transferred to an elevator system (which is actually an upwardly-inclined conveyor) which will transfer the cucumbers up to a desired level for transfer into some suitable container carried by the vehicle.

The power transfer for the several components of the machine is preferably obtained through a positive relationship with the power system of the vehicle; since in this fashion, a desired ratio can be maintained between the speed of the picking equipment and the forward movement of the vehicle. Suitable chain and sprocket power transfer systems are provided in the preferred forms of the invention, and such power is suitably split off and delivered to the picking mechanism, the conveyor, and the vine-elevating and supporting system.

The several features of this invention will be discussed in detail through an analysis of the particular embodiments illustrated in the accompanying drawings. In the drawings:

Figure 3 is a fragmentary section taken on the section line 3—3 of Figure 2.

Figure 4 is a side elevation of the device shown in Figure 3 with respect to Figure 3.

Figure 1:
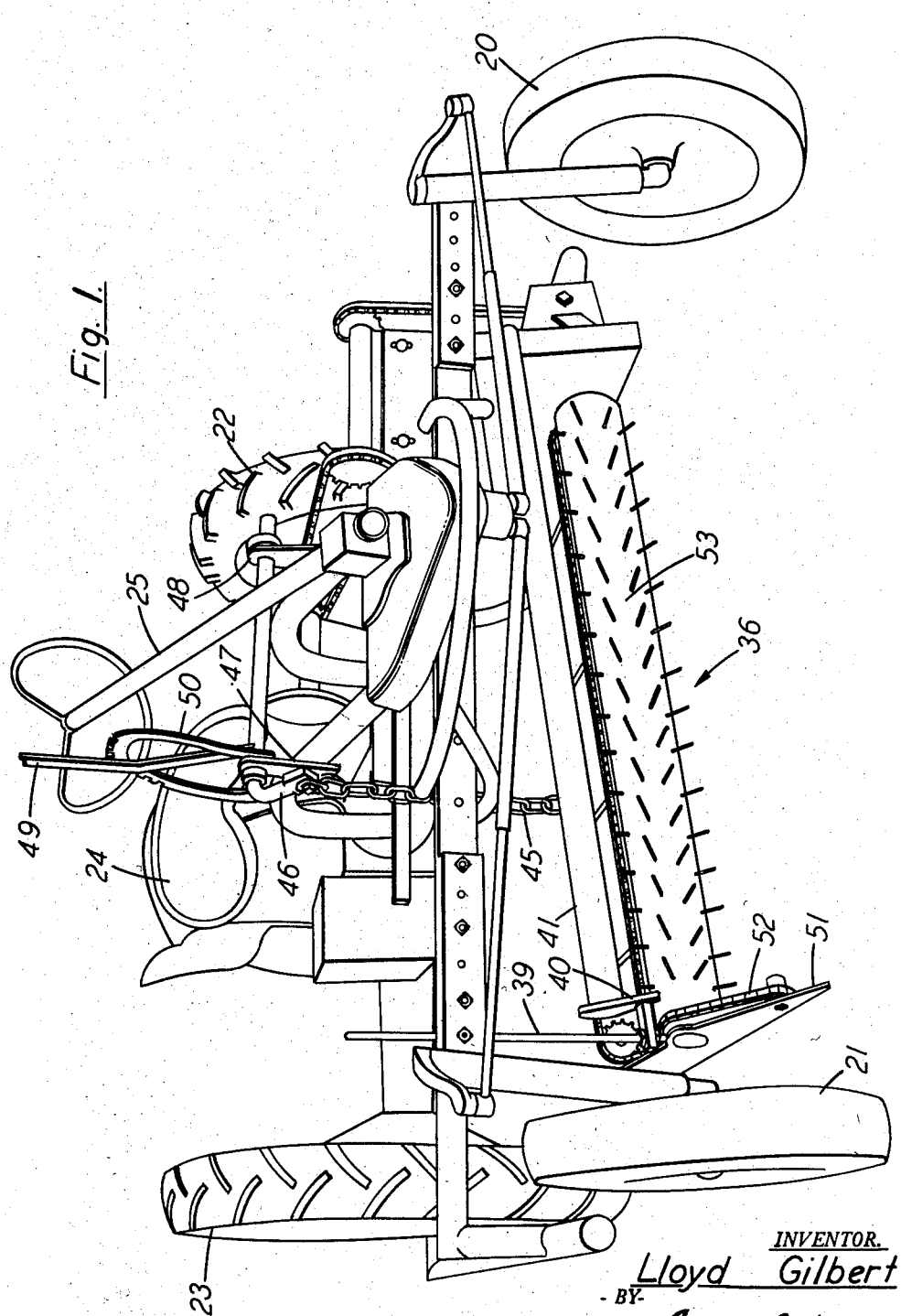
Figure 1 is a perspective view of the machine embodying one modification of this invention.

Figure 7 presents a reduced top view of the vehicle illustrated in Figure 1.

Figure 8 illustrates a modified form of this invention in a top view of the entire machine.

Figure 9 is an enlarged section taken on the section line 9—9 of Figure 8.

Figure 10 presents a fragmentary top plan view of an enlarged scale of picking and vine-elevating and guiding mechanism used in the modification of the invention illustrated in Figure 8.

Figure 11 is a section taken on an enlarged scale of the section line 11—11 of Figure 10.

Figure 12 presents a view on an enlarged scale of the power transfer mechanism taken on the section line 12—12 of Figure 10.

Referring particularly to Figures 1 and 7, the illustrated harvesting vehicle has front wheels 20 and 21, rear wheels 22 and 23, a driver's seat 24, and the usual steering assembly indicated generally at 25. A motor housing is generally indicated at 26. In addition to the conventional main frame of the tractor vehicle, which includes the forwardly-extending tubes 27 and 28 for supporting the front wheel assembly, an added main frame portion is provided which includes the transverse rear member 29, the opposite side members 30 and 31, and the transverse forward member 32. The side members 30 and 31 are positioned at a somewhat lower level than the cross member 32, with the opposite ends of the cross member 32 being connected to the side members by short vertical sections as indicated at 33 in Figure 4. At the forward end of the left-hand side member 30 of the frame, lugs 34 and 35 are provided (refer to Figure 2) which act as pivot points for the unit which performs the picking operation. The picking unit, which is generally indicated at 36, is connected to the lugs 34 and 35 by the bolts 37 and 38, about which the picking unit 36 is pivoted to secure a vertical adjustment of the opposite end of the unit with respect to the ground. A tie rod 39 secured at its lower end to the bracket 40 at the unsupported end of the cantilever beam 41 serves to limit the downward movement of the vertically adjustable end of the picking unit 36 through the engagement of the bolt 42 at the upper end of the rod 39 with an opening in the plate 43, which is secured with respect to the frame of the vehicle. The cantilever beam 41 is connected rigidly to the base portion 44a of the auxiliary frame 44 which supports the mechanism of the picking unit in operating relationship. A chain 45 extends between the cantilever beam 41 and a crank 46 which is suitably supported in bearing plates 47 and 48 on the frame of the vehicle. An operating handle 49, whose position is maintained by the notched sector 50, serves to elevate the left end of the picking unit 36, as viewed in Figure 1.

Figure 2:
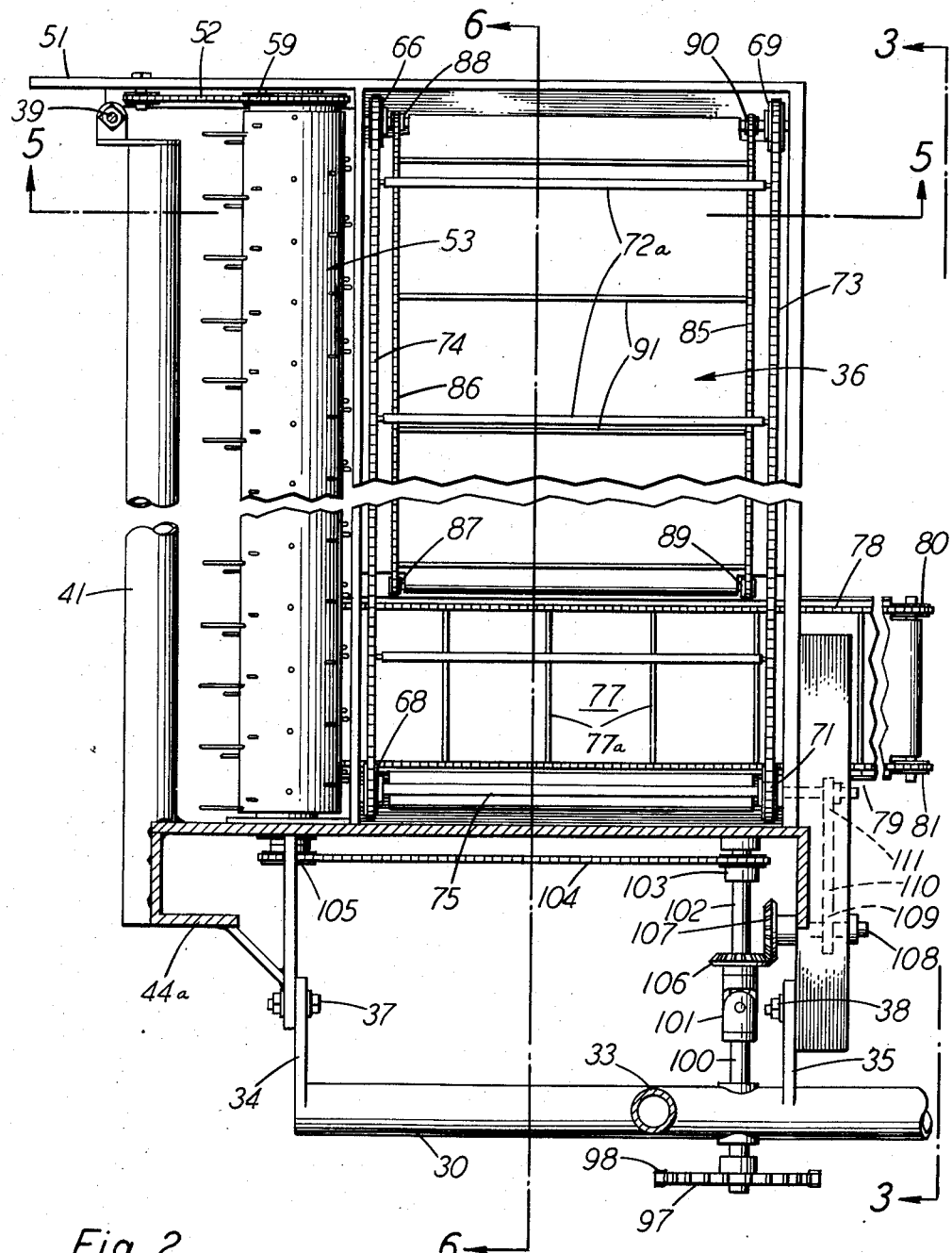
Figure 2 is an enlarged fragmentary plan view of the picking mechanism shown in Fig. 1.
Figures 5, 6:
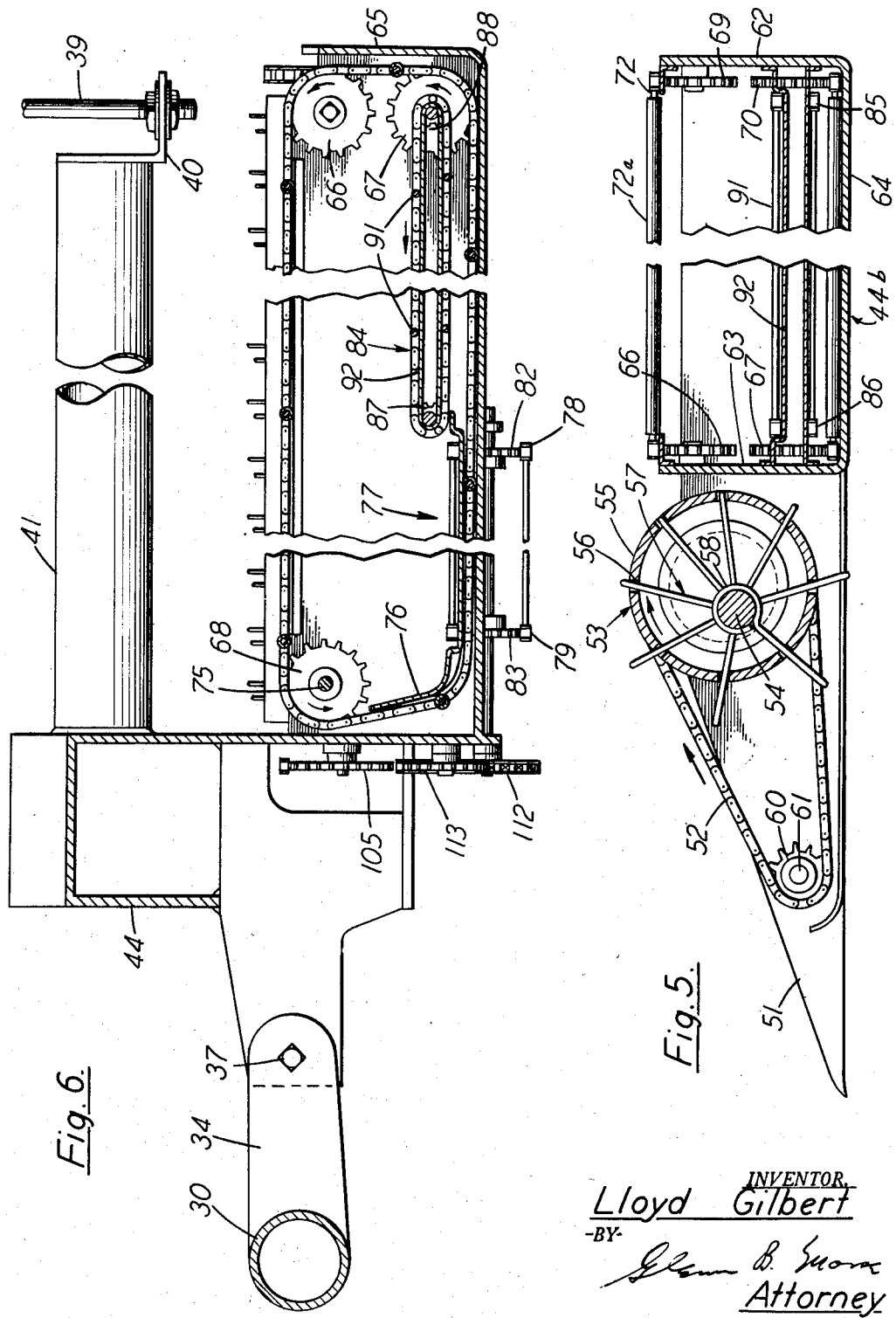
Figure 5 is an enlarged section taken on the section line 5—5 of Figure 2.
Figure 6 is a section taken on the section line 6—6 of Figure 2.

The picking unit 36 incorporated in the modification illustrated in Figures 1 and 7, is illustrated in greater detail in Figures 2, 5, and 6.

The first element of the machine encountered by a vine is the forwardly-converging shoe 51. The vehicle is steered along a path with respect to the row of vines such that the shoe 51 engages the vine at a point fairly close to where the vine enters the ground. The upper surface of the lifting shoe 51 gently elevates the vine as the vehicle moves along its path; and as the vine moves upwardly along the shoe, it encounters the moving chain 52. The upper portion of the chain 52 is positioned such that it engages the vine gently and urges it rearwardly with respect to the vehicle. While so doing, the vine is elevated at its heaviest portion a sufficient amount for the picking equipment to pass underneath. As the vine continues to move upwardly and to the rear with respect to the vehicle, the outer stem portions and leaf structure (in addition to any cucumbers which may be present) are encountered by the roller 53. This roller is preferably of a construction which provides for the articulation of a series of projecting fingers, resulting in a fork-like action tending to pick up and urge the plants in a rearward direction. The details of the roller form no part of this invention, but the reciprocating movement of the fingers is established by the mechanism best illustrated in Figure 5. A fixed shaft 54 is supported on an axis which is eccentric with respect to the axis of rotation of the cylindrical shell 55 of the roller. The shell 55 is provided with a series of openings 56 through which the fingers 57 project. These fingers have a bearing portion 58 which surrounds the fixed shaft 54, resulting in the fingers rotating about the axis of the shaft 54 as they are driven through the engagement of the outer ends of the fingers with the several apertures 56. Due to the eccentricity of the fixed shaft 54 with the axis of revolution of the cylindrical shell 55, the fingers will retract on the rearward side of the shell, and will extend on the opposite side. Additionally, the fingers will impart a forking movement to the vines as they approach, and urge them upwardly and to the rear into the area of the picking mechanism. Preferably, the lifting chain 52 is driven by a sprocket 59 which rotates with the roller 53. The forward section of the chain 52 is positioned by the idler sprocket 60 which is rotatably mounted on a stud 61 secured to the lifting shoe 51.

After the vines have been elevated and gently moved to the rear, and begin to pass over and beyond the area dominated by the roller 53, they are then caused to pass over the top of the picking unit. This unit is essentially a cantilever structure associated with the base of the auxiliary frame 44, and which includes the opposite side frame members 62 and 63. A bottom plate 64 completes the structure of a substantially U-shaped beam (in cross section) 44b, and an end plate 65 is also provided. Within this portion of the auxiliary frame, two spaced parallel endless chains are positioned by the sprockets 66, 67, and 68 (refer to Figure 6) for one chain, and the sprockets 69, 70, and 71 for the other. A series of rods 72, each surrounded by a piece of tubing 72a (refer to Figure 5), extends between the spaced chains 73 and 74, the rods acting as supports for the tubes which are freely rotatable thereon. The chains 73 and 74 are each driven by the common shaft 75, and the rotation of the shaft results in a rapid brushing action on the vines as the rod-tube assemblies 72 sweep by. Cucumbers which may be depending from the vines under the action of gravity are encountered by the moving striking members formed by the rod-tube assemblies 72, and are knocked free from their positions on the vines.

In addition to the corner sprockets which position the chains 73 and 74, the lower left corner of the path of movement of the chains, as illustrated in Figure 6, is determined by a guide plate 76. This guide plate extends under a section of the discharge conveyor generally indicated at 77, which extends in a direction approximately parallel to the movement of the vehicle, and is formed by the opposite chains 78 and 79 positioned by the sprockets 80, 81, 82, and 83. The construction of the discharge conveyor 77 is similar to that of the picking mechanism in that the rods 77a of the conveyor 77 extend between the spaced chains 78 and 79, with the top course of the chains being disposed so that the rods sweep across the floor provided by the plate 76.

The discharge conveyor 77 communicates with the receiver formed by the lateral conveyor 84, which likewise includes spaced chains 85 and 86, positioned by the sprockets 87, 88, 89, and 90, and connected by rods 91. The upper course of the chains 85 and 86 is positioned so that the rods 91 sweep across the floor panel 92 and deliver the pickles to the discharge conveyor 77.

The supply of power to the picking and vine-elevating mechanism is delivered through the chain 93 (refer to Figures 4 and 5). A bracket 94 is mounted on the transverse frame member 32, and is provided with bearings for the support of the shaft 95. A sprocket 96 is driven by the chain 93, and power is transferred through this system to the lower sprocket 97 through the medium of the chain 98 and the upper sprocket 99. The stub shaft 100 is rotatively supported in the frame member 30, and terminates in a universal joint 101 for the transfer of power to the connecting shaft 102 (refer to Figure 2). The shaft 102 is rotatively mounted in the auxiliary frame of the picking and vine-elevating unit 36, and the universal joint 101 is required to accommodate the variation in attitude of the picking unit as it moves about the pivot axis established by the bolts 37 and 38.

Rotation of the shaft 102 carries with it the sprocket 103 which drives the chain 104 extending around the sprocket 105 which drives the cylindrical outer shell of the vine-elevating roller 53. It is preferable that the surface speed of the roller 53 be somewhat in excess of rate of forward movement of the vehicle. It has been found that the engagement of the shoe 51 with the vines tends to move the vines in a generally forward direction with a pivoting motion about the point where the plant enters the ground. To maintain the proper orientation of the vines with respect to the planting row, it becomes necessary to restore the original position of the vines through controlling the backward movement of the vines relative to the vehicle.

In addition to driving the roller assembly 53 through the chain 104, the shaft 102 supplies the power for the action of the picking and conveying mechanism through the medium of the bevel gear 106 carried by the shaft 102, and the mating bevel gear 107 which is rotatively mounted in suitable bearings fixed to the auxiliary frame 44. The gear 107, in turn, drives the shaft 108 and the sprocket 109 affixed thereto. The chain 110 transfers power from the sprocket 109 to the next sprocket 111 for driving the shaft 75. This shaft drives the sprockets 68 and 71 which control the operation of the picker chains 73 and 74 which carry the striking rod-tube assemblies 72. It is preferable that the rate of movement of these chains be established at about three times the velocity of the forward movement of the vehicle. Under ordinary conditions, it has been found that this velocity ratio will result in an adequate picking action when the vehicle is traveling at approximately two miles per hour.

The operation of the transverse conveyor 84 is attained through the transfer of power from the picking chains. The rotation of the sprockets 67 and 70 carries with them the sprockets 88 and 90, and thereby drives the chains of the transverse conveyor. The communicating conveyor 77 is driven through the engagement of the sprocket 112 by the chain 104 (which also controls the roller 53). An idler sprocket 113 maintains the proper position of the chain 104 with respect to the surrounding structure.

Referring to Figure 8, a modified form of the invention is illustrated in which a different picking and vine-elevating mechanism is used. The vehicle on which the device is mounted is identical with that described in connection with Figure 1, except for the absence of the outer frame members 29, 30, 31, and 32. Support is provided for the modification of the picking mechanism shown in Figure 8 by the heavy bracket 114 secured to the central portion of the vehicle by the bolts 115 and 116. The left-hand end of the bracket as viewed at Figure 8 terminates in a transverse vertical plate 117 to which the auxiliary frame 118 of the operating mechanism is secured by the bolts 119 and 120. The auxiliary frame 118 is provided with the bearings 121 and 122 which position the shaft 123 (refer to Figure 12). This shaft forms the dual function of driving the operating mechanism associated with the conveying and picking mechanism, and also that of providing a fulcrum for the same mechanism whereby the opposite end may be vertically adjusted. A channel-shaped frame formed by the side walls 124 and 125 and the bottom panel 126 serves as a frame for supporting the picking and the vine-elevating mechanisms. This frame is pivotally mounted on the vehicle at the shaft 123, and the side walls 124 and 125 are extended upwardly to form an elevated point of connection for the transverse plate 127b which acts as a base for the lifting tube 127. This tube extends transversely to a point opposite the conventional mechanism 128 provided for lifting adjustment of various implements. This cantilever arrangement of the lifting tube 127 is necessary in view of the requirement that the opposite end of the picking mechanism must be clear of any vertical supports in order to avoid interference with the movement of the vines.

The first contact of the machine with the vines is established by the conical member 129 which is rotatably mounted on the forward portion 130 of the sub-frame secured to the end of the channel-shaped portion shown in cross section in Figure 12. The forward end of a free roller 131 is also pivotally mounted on the portion 130 of the sub-frame, the opposite end of the roller being received in the bracket 132. As the vehicle moves forward after initially establishing contact with the vine at a point near where it enters the ground, the rotating conical member 129 (which is driven in a counterclockwise direction with respect to the view shown in Figure 10, when viewed from the rear) urges the vines upwardly and to the rear. This action is facilitated by the provision of the conical helical ridge 133 which serves to increase the degree of engagement between the roller 129 and the vine. Continued movement of the vehicle brings the stem and leaf portions of the vine into contact with the free roller 131, which facilitates the movement of the picking mechanism underneath the vines.

As the vines move to the rear with respect to the vehicle, they progressively encounter the action of the beating or striking members 134 which are preferably constructed in a similar fashion to the members 72 described previously. Such construction involves an outer tubular member 134a which is free to rotate upon an inner rod 134b, the inner rods being fixed with respect to the rotatably-mounted end plates 135 and 136. These plates are preferably mounted upon a central tubular shaft 137, which has the suitable journal extensions for cooperation with bearings provided in the plates 138 and 139. The conical roller 129 is driven through an extended portion of the forward journal section of the shaft 137 through the medium of the flexible connection 140.

As viewed in Figure 10, the upper portion of the movement of the members 134 about the axis of the shaft 137 is directed toward the conveyor unit generally indicated at 141. The sweeping action provided by the members 134 tends to knock the cucumbers from the vines into the conveyor 141. The conveyor itself is formed by the spaced parallel endless chains 142 and 143 positioned by the sprockets 144, 145, 146, and 147. The sprockets 144 and 145 are driven by the shaft 123. A series of rods 148 extends between the chains 142 and 143, and sweeps the area above the floor 149 against which the cucumbers are thrown by the rotating members 134. Movement of the conveyor brings the cucumbers to the left as viewed in Figure 10 to the point of discharge onto the tray 150. From this point, an elevating conveyor 151 (of conventional construction) lifts the cucumbers to a position from which they can be transferred to a convenient accumulating bin.

Power is supplied to the mechanism shown in Figure 8 through the chain 152 driven by the motor of the vehicle. A sprocket 153 is driven by this chain, which in turn drives the shaft 154 and the bevel gear 155. A mating bevel gear 156 rotates on the shaft 157, and drives the bevel gear 158 associated with the shaft 123 (refer to Figure 12). An extension of the shaft 154 to the left as shown in Figure 10 supplies power to the elevating conveyor 151.

The shaft 123 is also provided with the sprocket 159 which transfers power to the shaft 160 through the chain 161 and the sprocket 162. The shaft 160 is rotatably supported in bearings 163 and 164 mounted on the sub-frame of the picking mechanism, and the opposite end of the shaft 160 from the sprocket 162 drives the bevel gear 164 which meshes with the horizontal bevel gear 165. In this manner, power is supplied to the vertical shaft 166, which is rotatably supported in the bearings 167 and 168, and with which power is supplied to the rotating picker through the engagement of the bevel gear 169 with the mating bevel gear 170 mounted on the extension 171 of the shaft 137. A vertical roller 172 is positioned in the path of movement which a vine would take as it approached the rear wheel of the vehicle. The purpose of the roller 172 is to deflect the vines from the wheel and prevent damage which would otherwise result. The roller 172 may either be driven by the shaft 166, or may rotate freely thereon.

In Figure 8, and also in Figure 7, the picking machine is shown operating in conjunction with a series of vines planted along a row indicated at 172. The vines 173 are arranged at approximately 45° with respect to the planting row, and it is desirable to maintain this relationship as the vehicle performs its function. The maintenance of this relationship may be accomplished by appropriately establishing the angle of the picking assembly (in plan view, as in Figure 8) with the path of movement of the vehicle. The vines, after several passages of the machine, will assume a position of equilibrium with a particular angle of adjustment of the picker. The path of movement of the vines with respect to the picking equipment is illustrated by the dotted lines as 173 in Figure 9. A cucumber 174 is also indicated in dotted lines where it has been forcibly knocked (toward the conveyor 141) by the action of the rotating elongated members 134. Preferably, the material forming the sides 124 and 125, and also the bottom 126 of the conveyor, is extended to form a trough at 175 surrounding the lower half of the path of movement of the striking members 134.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; receiver means mounted on said harvester and disposed adjacent the path of movement of said striking member in position to receive cucumbers removed from vines by said striking member; and drive means operatively associated with said picking means and with said harvester.

2. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means said auxiliary frame also extending downwardly from said point of connection; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; receiver means mounted on said harvester and disposed adjacent the path of movement of said striking member in position to receive cucumbers removed from vines by said striking member; and drive means operatively associated with said picking means and with said harvester.

3. A cucumber-harvester, comprising: a main frame; ground-engaging means supporting said main frame; auxiliary frame means pivotally mounted on said main frame adjacent one end of said auxiliary frame means and extending laterally from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; receiver means mounted on said harvester and disposed adjacent the path of movement of said striking member in position to receive cucumbers removed from vines by said striking member; and drive means operatively associated with said picking means and with said harvester.

4. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one elongated striking member moveably mounted with respect to said auxiliary frame means for movement underneath the vine position established by said vine-elevating and guiding means; and drive means operatively associated with said picking means.

5. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines; said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; receiver means disposed adjacent the path of movement of said striking member in position to receive cucumbers removed from vines by said striking member; and drive means operatively associated with said picking means, said striking members being moved by said driving means at a velocity substantially constant with respect to the forward velocity of said harvester.

6. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including parallel chain and guide-wheel means mounted on said auxiliary frame means and spaced from each other along the axes of said guide-wheel means, and a plurality of elongated members extending between said chain and guide-wheel means, said chain and guide-wheel means being disposed below the vine position established by said vine-elevating and guiding means; receiver means disposed between and below the upper portions of said spaced chain means; and drive means operatively associated with said picking means.

7. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; conveyor means mounted on said auxiliary frame means and disposed adjacent the path of movement of said striking member in position to receive cucumbers removed from vines by said striking member; and drive means operatively associated with said picking means and with said conveyor means to induce movement of the upper portion thereof away from said unsupported end.

8. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including parallel chain and guide-wheel means mounted on said auxiliary frame means and spaced from each other along the axes of said guide-wheel means, and a plurality of elongated members extending between said chain and guide-wheel means, said chain and guide-wheel means being disposed below the vine position established by said vine-elevating and guiding means; conveyor means mounted on said auxiliary frame means and disposed between and below the upper portions of said spaced chain means; and drive means operatively associated with said picking means and for said conveyor means to induce movement of the upper portion thereof away from said unsupported end.

9. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means being disposed adjacent said unsupported end of said auxiliary frame means; picking means mounted on said auxiliary frame means and including at least one striking member moveably mounted with respect to said auxiliary frame means for movement underneath the vine position established by said vine-elevating and guiding means; conveyor means mounted on said auxiliary frame means and disposed adjacent the path of movement of said striking member in position to receive cucumbers removed from vines by said striking member; drive means operatively associated with said picking means, with said conveyor means to induce movement of the upper portion thereof away from said unsupported end, and with said harvester, said striking members being moved by said driving means at a velocity substantially constant with respect to the forward velocity of said harvester; and elevating means communicating with the discharge end of said conveyor means.

10. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means including a forwardly-extending converging lifting member disposed adjacent said unsupported end of said auxiliary frame means, said vine-elevating and guiding means also including endless belt means having the upper portion thereof extending rearwardly and upwardly from a position adjacent the forward portion of said lifting member; picking means mounted on said auxiliary frame means underneath the vine position established by said vine-elevating and guiding means; receiver means mounted on said harvester and disposed adjacent said picking means in position to receive cucumbers removed from vines by said picking means; and drive means operatively associated with said endless belt means for driving the same in a direction to move the upper surface thereof to the rear, and with said picking means.

11. A cucumber-harvester, comprising: a main frame; ground-engaging means supporting said main frame; auxiliary frame means mounted on said main frame and extending laterally, from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means including a forwardly-extending converging lifting member adjacent said unsupported end of said auxiliary frame means, said vine-elevating and guiding means also including endless bell means having the upper portion thereof extending rearwardly and upwardly from a position adjacent the forward portion of said lifting member, and roller means mounted on said auxiliary frame means and extending laterally from said belt means; picking means mounted on said auxiliary frame means underneath the vine position established by said vine-elevating and guiding means; receiver means mounted on said harvester and disposed adjacent said picking means in position to receive cucumbers removed from vines by said picking means; and drive means operatively associated with said roller means and with said endless belt means for operating the same in a direction to move the upper surface thereof to the rear, and with said picking means.

12. A cucumber-harvester, comprising: a main frame; wheel means supporting said main frame; auxiliary frame means pivotally mounted on said main frame adjacent one end of said auxiliary frame means and extending laterally from the point of connection of said auxiliary frame means to said main frame, to an end of said auxiliary frame means which is unsupported by said main frame means; vine-elevating and guiding means mounted on said auxiliary frame means for elevating and supporting vines as said auxiliary frame means moves underneath said vines, said vine-elevating and guiding means including a forwardly-extending converging lifting member adjacent said unsupported end of said auxiliary frame means, said vine-elevating and guiding means also including endless belt means having the upper portion thereof extending rearwardly and upwardly from a position adjacent the forward portion of said lifting member, and roller means mounted on said auxiliary frame means and extending laterally from said belt means; picking means mounted on said auxiliary frame means and including parallel chain and guide-wheel means spaced from each other along the axes of said guide-wheel means, and a plurality of elongated independently rotatable members extending between said chain and guide-wheel means, said chain and guide-wheel means being disposed below the vine position established by said vine-elevating and guiding means; conveyor means mounted on said auxiliary frame means and disposed between and below the upper portions of said spaced chain means; drive means operatively associated with said roller means and with said vine-elevating endless belt means for operating the same in a direction to move the upper surface thereof to the rear, with said picking means for said conveyor means to induce movement of the upper portion thereof away from said unsupported end, and with said harvester, said elongated members being moved by said driving means at a velocity substantially constant with respect to the forward velocity of said harvester; and elevating means mounted on said harvester and communicating with the discharge end of said conveyor means.

13. A cucumber-harvester, comprising: a main frame; wheel means supporting said main frame; auxiliary frame means pivotally mounted on said main frame adjacent one end of said auxiliary frame means; vine-elevating and guiding means mounted on said auxiliary frame means for elevating and supporting vines as said auxiliary frame means moves underneath said vines, said vine-elevating and guiding means including a forwardly-extending rotatable conical lifting member adjacent said unsupported end of said auxiliary frame means, said vine-elevating and guiding means also including endless belt means having the upper portion thereof extending rearwardly and upwardly from a position adjacent the forward portion of said lifting member, and roller means mounted on said auxiliary frame means and extending laterally from said bolt means; picking means including parallel belt and guide-wheel means spaced from each other along the axes of said guide-wheel means, and a plurality of elongated independently rotatable members extending between said belt and guide-wheel means, said belt and guide-wheel means being disposed below the vine position established by said vine-elevating and guiding means; conveyor means disposed between and below the upper portions of said spaced belt means; drive means for said conical member for rotating the same in a direction to pull a vine in contact with the upper portion thereof toward said picking means, for said roller means and said vine-elevating endless belt means for operating the same in a direction to move the upper surface thereof to the rear, for said picking means for said conveyor means to induce movement of the upper portion thereof away from the end adjacent said lifting member, and for said harvester, said elongated members being moved by said driving means at a velocity substantially constant with respect to the forward velocity of said harvester; and elevating means mounted on said harvester and communicating with the discharge end of said conveyor means.

References Cited in the file of this patent

UNITED STATES PATENTS

| | | |
|---|---|---|
| 1,565,189 | Morgan | Dec. 9, 1925 |
| 2,242,077 | Jones | May 13, 1941 |
| 2,318,229 | Jones | May 4, 1943 |
| 2,522,644 | Searcy | Sept. 19, 1950 |
| 2,698,506 | Rushfeldt | Jan. 4, 1955 |